United States Patent [19]

Muto et al.

[11] Patent Number: 5,497,377
[45] Date of Patent: Mar. 5, 1996

[54] COMMUNICATION SYSTEM AND METHOD OF DETECTING TRANSMISSION FAULTS THEREIN

[75] Inventors: Minoru Muto; Masanori Yamazi; Noriyuki Hattori, all of Aichi, Japan

[73] Assignees: Mitsubishi Denki Kabushiki Kaisha; Mitsubishi Electric Engineering Co., Ltd., both of Toyko, Japan

[21] Appl. No.: 220,664

[22] Filed: Mar. 31, 1994

[30] Foreign Application Priority Data

Mar. 31, 1993 [JP] Japan .................. 5-073277

[51] Int. Cl.⁶ ............................................. G06F 11/00
[52] U.S. Cl. ................................... 371/20.4; 371/27
[58] Field of Search ........................... 371/6.1, 20.1, 371/20.4, 27; 370/17, 13

[56] References Cited

U.S. PATENT DOCUMENTS

| 5,351,245 | 9/1994 | Pregont et al. ............ 371/20.4 |
| 5,390,199 | 2/1995 | Ajima et al. ............... 371/20.4 |

FOREIGN PATENT DOCUMENTS

| 0016416 | 10/1980 | European Pat. Off. . |
| 0264879 | 4/1988 | European Pat. Off. . |
| 0279491 | 8/1988 | European Pat. Off. . |
| 1417325 | 12/1975 | United Kingdom . |
| 1597139 | 9/1981 | United Kingdom . |
| 2154104 | 8/1985 | United Kingdom . |
| 2273854 | 6/1994 | United Kingdom . |
| WO-A8301134 | 3/1983 | WIPO . |

*Primary Examiner*—Vincent P. Canney
*Attorney, Agent, or Firm*—Sughrue, Mion, Zinn, Macpeak & Seas; Richard C. Turner

[57] ABSTRACT

A transmission system comprising a plurality of stations, each having transmission and receiving circuits, that are connected in a ring configuration and use a HDLC-type protocol for transmission. The fault of a transmission circuit in a station can be detected in an idle state time by transmitting a fixed bit pattern during an idle state of transmission. Each station has a fixed bit pattern generator for outputting a fixed bit pattern during an idle time. Each station also has fault detection means which detects a fault when it receives a signal other than transmission data and the fixed bit pattern. Since the state of a line can always be monitored, a fault of the line state can be rapidly identified. Since transmission data is not encoded, the data transmission can be conducted at a high speed.

10 Claims, 13 Drawing Sheets

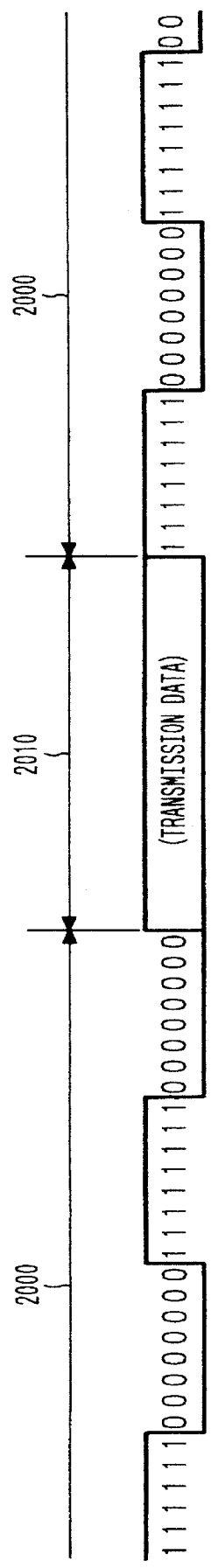
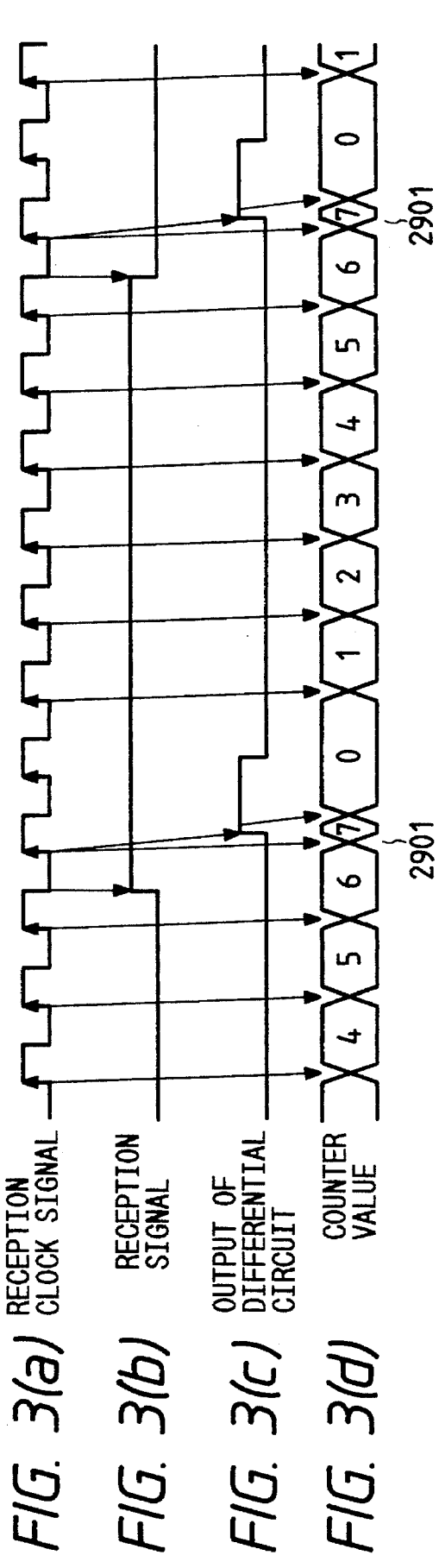
FIG. 2
FIG. 3(a) RECEPTION CLOCK SIGNAL
FIG. 3(b) RECEPTION SIGNAL
FIG. 3(c) OUTPUT OF DIFFERENTIAL CIRCUIT
FIG. 3(d) COUNTER VALUE

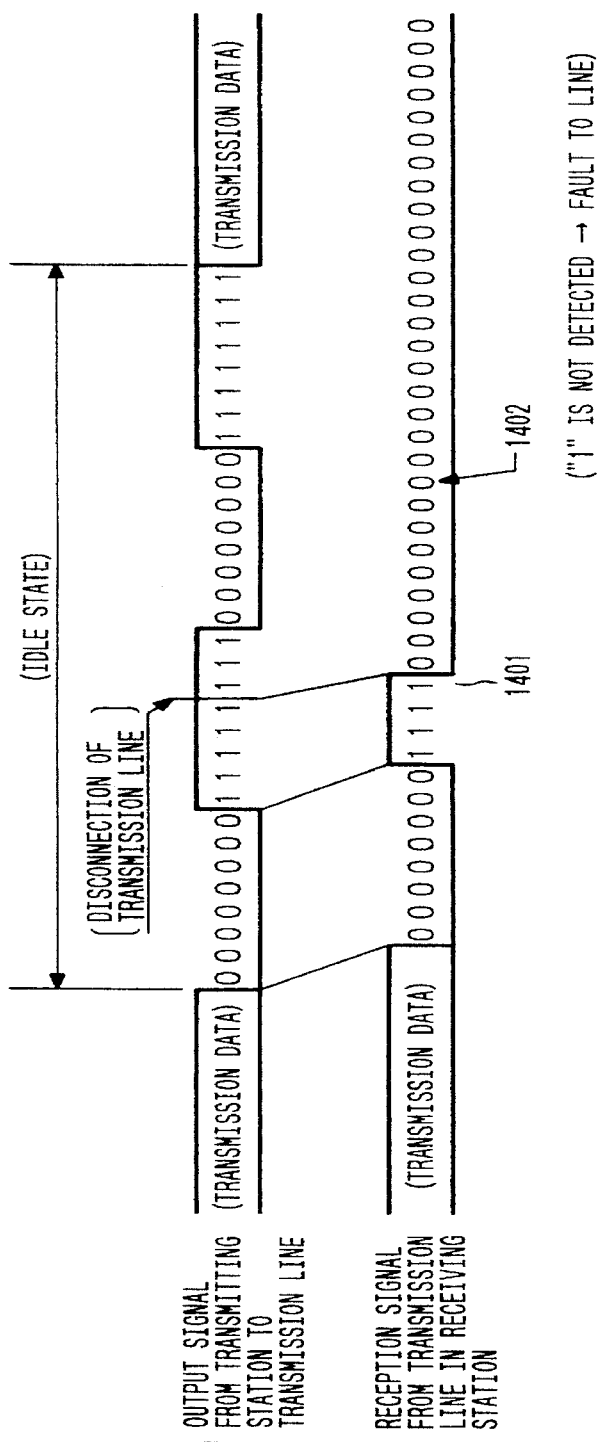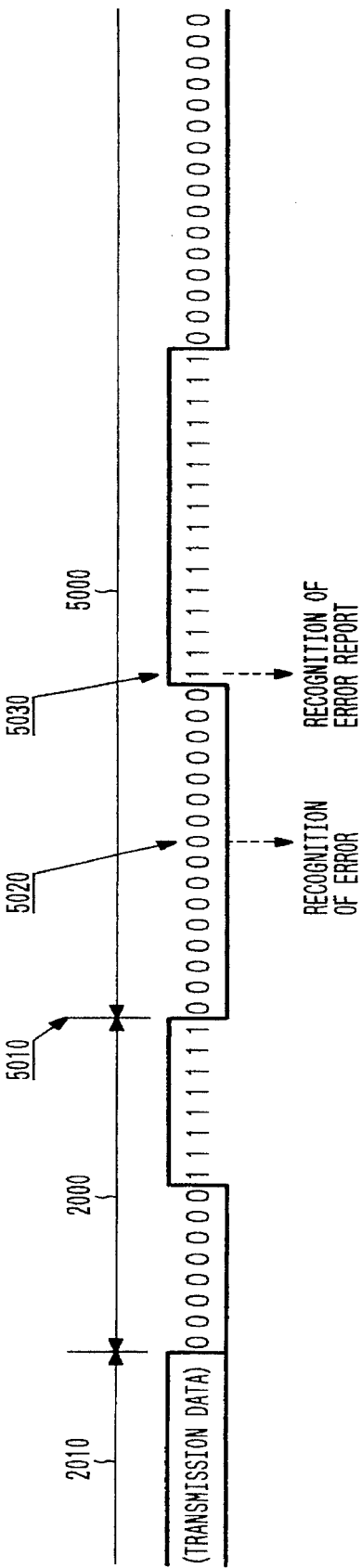

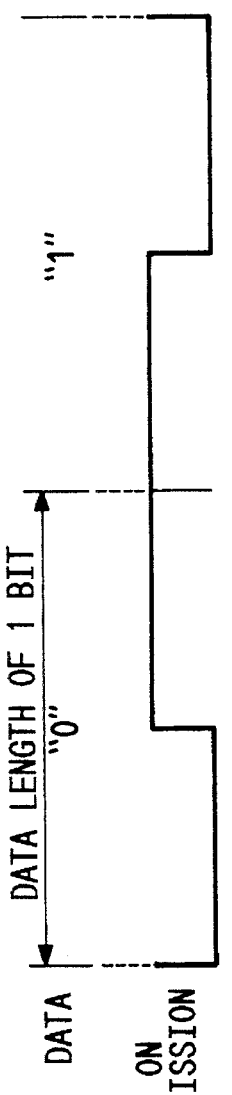
FIG. 14(a) DATA
FIG. 14(b) SIGNAL ON TRANSMISSION LINE
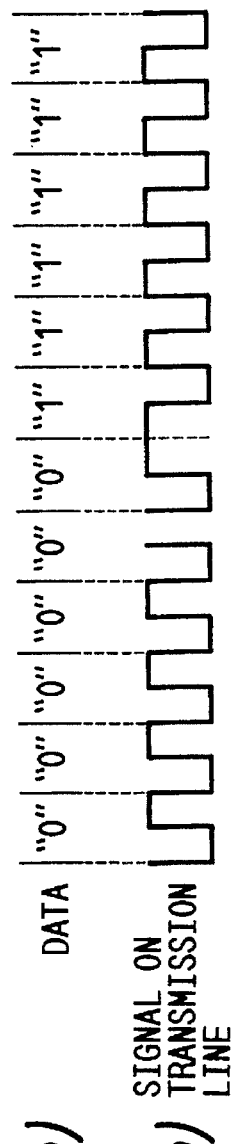
FIG. 15(a) DATA
FIG. 15(b) SIGNAL ON TRANSMISSION LINE
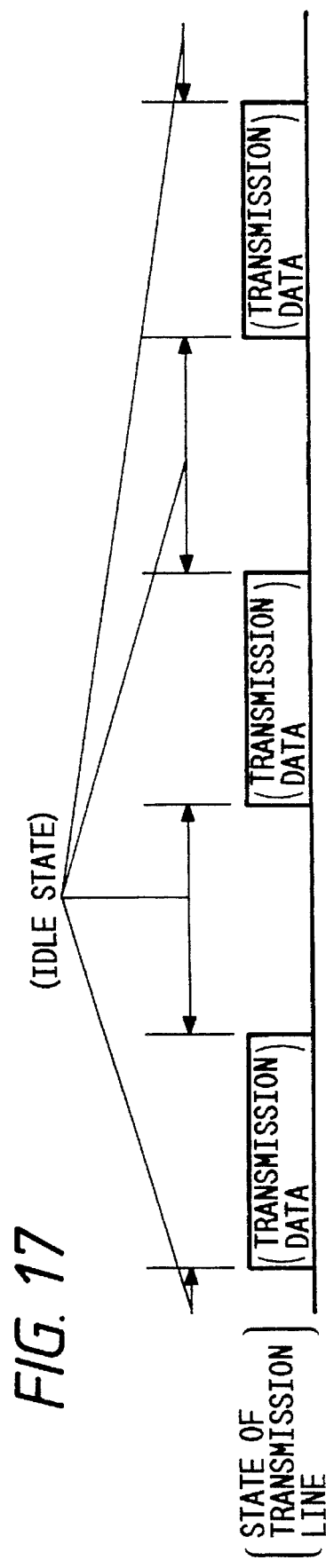
FIG. 17

COMMUNICATION SYSTEM AND METHOD OF DETECTING TRANSMISSION FAULTS THEREIN

BACKGROUND OF THE INVENTION

1. Field of the Invention

The invention relates to a communication system which has a function of detecting a fault and which can conduct a high-speed data transmission.

2. Description of the Related Art

FIG. 16 shows a block diagram of a network in which stations A, B, C and D are connected so as to form two loops of station A→station B→station C→station D→ station A (loop F), and station A→station D→station C →station B→station A (loop R), and signals are bidirectionally transmitted.

This network has a duplicated configuration of loop F and loop R. Therefore, even when a fault such as disconnection of a line occurs in one of the loops, data transmission can continue using the other loop.

Each of stations A to D comprises a CPU, a transmitting unit and a receiving unit for loop F, and a transmitting unit and a receiving unit for loop R. For example, a signal transmitted from the transmitting unit of station A is received by the receiving unit of station B, and then transmitted from the transmitting unit of station B to the receiving unit of station C. In this way, a signal is sequentially transmitted in a forward direction to the stations in loop F. Transmission in the opposite (reverse) direction is accomplished using loop R.

In the network, station A is a host station, and the other stations (stations B to D) are satellite stations. The host station, i.e., station A, controls and monitors the network so as to cope with a fault of the network.

In a method which is conducted by station A to detect a fault of the satellite stations (stations B to D) and transmission lines 700 to 707, for example, the host station detects a fault on the basis of times occupied by satellite stations for transmission and reception processes, and intervals of transmission and reception processes. Thus, when a satellite station detects a reception of abnormal data, the satellite station informs the host station. In one method which may be conducted by a satellite station to detect a fault, received data is subjected to a parity check or a sum check.

In such methods, however, it is impossible to detect a fault, such as the disconnection of a transmission line, which occurs during the idle state shown in FIG. 17 (a period during which no transmission data exists on the transmission line is referred to as an idle time, and the transmission line is in the idle state during the idle time). In order to deal with this problem, the method described below is conventionally employed. In the method, signals to be transmitted to a transmission line are encoded with Manchester encoding or the like, or signals including the state of the transmission line and having a signal level that is inverted within a predetermined time (within a bit time) are transmitted, and a fault is detected when a signal which fails to change in level within the predetermined time (i.e., a signal having a coding scheme other than that specified) is received.

Next, the signal transmission between stations in accordance with a conventional technique using such an encoding system will be described in detail, using the transmission between station B 200 and station C 300 as an example.

FIG. 13 is a block diagram showing in detail a CPU 500 and a transmitting unit 600 for loop F of station B 200, and a receiving unit 800 and a CPU 900 for loop F of station C 300. In the figure, the transmitting unit 600 of station B 200 and the receiving unit 800 of station C 300 are connected to each other through a transmission line 701.

As shown in FIG. 16, for each of loops F and R, station B 200 comprises the receiving unit 6000, the CPU 500 and the transmitting unit 600. The numbers 200–204, 6000–6004, etc represent stations and units concerned with different embodiments, as explained hereinafter. In FIG. 13, among of these units, only the CPU 500 and the transmitting unit 600 for loop F are shown, and the receiving unit 6000 for loop F is not shown.

Similarly, for each of loops F and R, station C 300 comprises the receiving unit 800, the CPU 900 and the transmitting unit 8000. In FIG. 13, among of these units, only the receiving unit 800 and the CPU 900 for loop F are shown, and the transmitting unit 8000 for loop F is not shown.

In FIG. 13, 500 designates the CPU of station B 200, 600 designates the transmitting unit, 1000 designates an encoder for encoding data to be transmitted, and 103 designates a transmitter for converting information output from the CPU 500 into information which can be input to the encoder 1000. The transmitting unit 600 consists of the transmitter 103, and the encoder 1000.

The reference numeral 800 designates the receiving unit of station C 300, 900 designates the CPU, 1001 designates a decoder for restoring an encoded signal on the transmission line to the original form, and 109 designates a receiver for converting information output from the decoder 1001 into information which can be input to the CPU 900. The receiving unit 800 consists of the decoder 1001, and the receiver 109.

When a signal is to be transmitted from station B 200 to station C 300 through the transmission line 701, station B 200 transmits a signal encoded by the encoder 1000 for each bit, during both the idle time and the time of transmission of transmission data. In station C 300, a reception signal is decoded by the decoder 1001 to restore original information which has not yet been encoded even during the idle time.

In the case where a fault such as disconnection of the transmission line occurs in the transmission line, generally, a reception signal after the point of the fault generation is fixed to "0" or "1".

When the decoder 1001 detects a reception signal having a coding scheme other than that specified, for example, fixed to "0" (LOW level) or "1" (HIGH level), the decoder 1001 outputs a decoding error. The decoding error is input as an interruption signal to the CPU 900 of station C 300 so that the CPU 900 recognizes a fault of the transmission line.

Specifically, when encoding is conducted in accordance with Manchester encoding, data "1" changes "from H to L" and data "0" changes "from L to H" during a 1-bit data time as shown in FIGS. 14(a) and 14(b). Also when data "1" is consecutively transmitted as shown in FIGS. 15(a) and 15(b), a signal on the transmission line changes. In a normal state, a signal on the transmission line 701 also changes in the idle state. Accordingly, when a signal on the transmission line 701 is fixed to "0" or "1", the CPU 900 can recognize a fault of the network.

However, such encoding causes a signal change on the transmission line 701 to be rapidly conducted as compared with the case where a signal is not encoded. Consequently, the data transmission rate must be set to be a value lower than the threshold frequency f which is restricted by the physical properties of the transmission line 701 (in the case of Manchester encoding, f/2).

In a conventional communication system, when employing a method in which encoding is conducted for each 1-bit data, there arises a problem in that the data transmission rate must be set to be a value lower than the threshold frequency f which is restricted by the physical properties of the transmission line. When employing a method in which the interval of transmission and reception processes is monitored, the interval of transmission and reception processes must be set to a time shorter than a predetermined time. Since a fault of the transmission line such as disconnection of the line is detected on the basis of the value of the interval of transmission and reception processes, the employment of such a method produces problems in that the detection requires a prolonged time and that the load on the internal processing of the transmitting station is increased.

The message identifying a fault state in the transmitting station is transmitted from the transmitting station to the receiving station in the same manner as a transmission of ordinary data, whereby a problem arises in that the process of sending the message requires a prolonged time.

The invention solves these problems. Accordingly, it is an object of the invention to provide a communication system in which a detection of a fault of a transmission line, such as disconnection of the line, need not wait for the interval of transmission and reception processes and can immediately be conducted during the idle time. The data transmission rate is not lowered, and it is not necessary to periodically transmit transmission data, so that the load on the internal processing of the transmitting station need not be increased.

It is another object of the invention to provide a communication system in which a fault state of the transmitting station can immediately be reported to the receiving station.

SUMMARY OF THE INVENTION

In the communication system according to the invention, transmission data in which the number of consecutive bits of the same logical level is less than a first predetermined number is transmitted, and a transmitting station comprises fixed bit pattern output means for repeating an operation in which bits of the same logical level and of a number which is equal to or greater than the first predetermined number are consecutively output, the logical level is then inverted, and successive bits of the same logical level and of a number which is equal to or greater than the first predetermined number are consecutively output. Switch means conducts a switch operation so that, during an idle time other than a transmission time for transmitting transmission data, the output of the fixed bit pattern output means is transmitted. In a receiving station, a fault is detected on the basis of a consecutive reception of bits of the same logical level and of a number which is equal to or greater than the number of the consecutive bits of the same logical level which are output by the fixed bit pattern output means.

Furthermore, transmission data in which the number of consecutive bits of the same logical level is less than a first predetermined number is transmitted, and a transmitting station comprises: first fixed bit pattern output means for repeating an operation in which bits of the same logical level and of a number which is equal to or greater than the first predetermined number are consecutively output, the logical level is then inverted, and in successive bits of the same logical level and of a number which is equal to or greater than the first predetermined number are consecutively output; and second fixed bit pattern output means for repeating an operation in which bits of the same logical level and of a number equal which is equal to or greater than the number of consecutive bits of the same logical level which are output by the first fixed bit pattern output means are consecutively output, the logical level is then inverted, and successive bits of the same logical level and of a number which is equal to or greater than the number of consecutive bits of the same logical level which are output by the first fixed bit pattern output means are consecutively output. Switch means conducts a switch operation so that, during an idle time other than a transmission time for transmitting transmission data, the output of the first fixed bit pattern output means is transmitted during the time other than a time for reporting a fault, and the output of the second fixed bit pattern output means is transmitted during a time for reporting a fault. In a receiving station, a fault or a reception of a fault reporting is detected on the basis of existence of a consecutive reception of bits of the same logical level and of a number which is equal to or greater than the number of the consecutive bits of the same logical level which are output by the first fixed bit pattern output means, and a consecutive reception of bits of the same logical level and of a number which is equal to or greater than the number of the consecutive bits of the same logical level which are output by the second fixed bit pattern output means.

Furthermore, a transmitting station comprises: transmission signal transmission halt means for halting a transmission of a transmission signal every time a transmission corresponding to a predetermined number of cycles of a transmission clock signal is conducted, including an idle time; and logical signal output means for outputting a logical signal every time a transmission of a transmission signal is halted by the transmission signal transmission halt means, a logical signal previously output by the logical signal output means being different in kind from a logical signal newly output by the logical signal output means. Switch means conducts a switch operation so that, during a period when a transmission of a transmission signal is halted by the transmission signal transmission halt means, the output of the logical signal output means is transmitted. In a receiving station, a fault is detected on the basis of a consecutive reception of bits of the same logical level and of a number which is greater than the predetermined number of cycles of the transmission clock signal.

Furthermore, transmission data in which the number of consecutive bits of the same logical level is less than a first predetermined number is transmitted, and a transmitting station comprises inverting means for inverting a logical level of a transmission signal. Switch means conducts a switch operation so that, each time a time longer than a period corresponding to the first predetermined number of cycles of a transmission clock signal has elapsed, the transmission signal and the output of the inverting means are alternately transmitted. In a receiving station, a fault is detected on the basis of a consecutive reception of bits of the same logical level and continuing for a period which is longer than a time interval of switching of the switch means.

BRIEF DESCRIPTION OF THE DRAWINGS

FIG. 2 is a time chart showing signals on a transmission line the first embodiment of the invention.

FIGS. 3(a) to 3(d) are time charts showing the operation of a counter of a receiver in the first embodiment of the invention.

FIGS. 4(a) and 4(b) are time charts showing signals on the transmission line in the first embodiment of the invention.

FIG. 6 is a time chart showing signals on a transmission line in the second embodiment of the invention.

FIGS. 14(a) and 14(b) are diagrams illustrating Manchester encoding used in the conventional technique.

FIGS. 15(a) and 15(b) are diagrams illustrating Manchester encoding used in the conventional technique.

FIG. 17 is a diagram illustrating an idle state.

DESCRIPTION OF THE PREFERRED EMBODIMENTS

Figure 1:
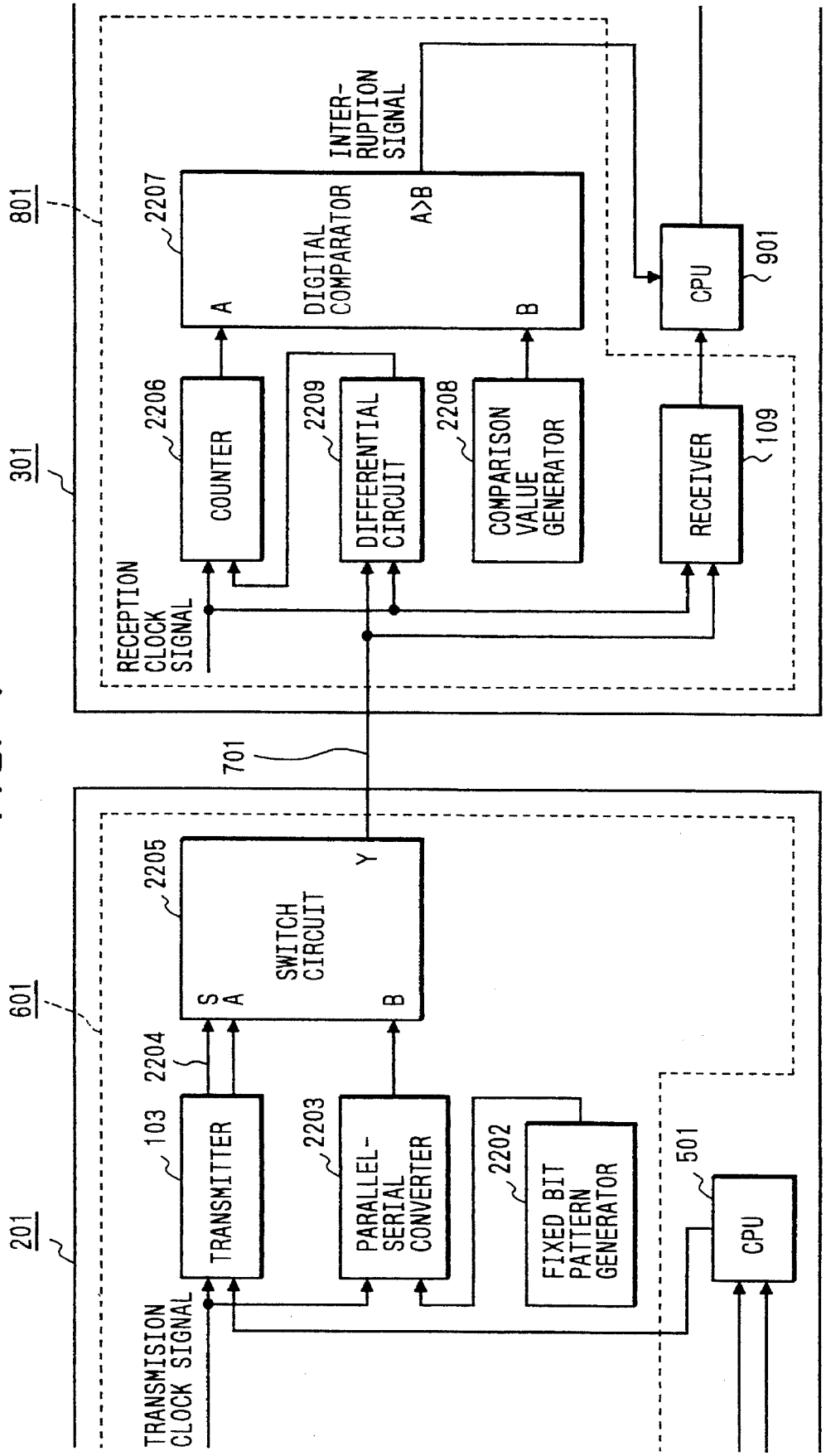
FIG. 1 is a block diagram showing a communication system of a first embodiment of the invention.

In the communication system according to the invention, transmission data in which the number of consecutive bits of the same logical level is less than a first predetermined number is transmitted, and a transmitting station comprises fixed bit pattern output means for repeating an operation in which bits of the same logical level and of a number which is equal to or greater than the first predetermined number are consecutively output, the logical level is then inverted, and in succession bits of the same logical level and of a number which is equal to or greater than the first predetermined number are consecutively output. Switch means conducts a switch operation so that, during an idle time other than a transmission time for transmitting transmission data, the output of the fixed bit pattern output means is transmitted. In a receiving station, a fault is detected on the basis of a consecutive reception of bits of the same logical level and of a number which is equal to or greater than the number of the consecutive bits of the same logical level which are output by the fixed bit pattern output means.

Furthermore, transmission data in which the number of consecutive bits of the same logical level is less than a first predetermined number is transmitted, and a transmitting station comprises: first fixed bit pattern output means for repeating an operation in which bits of the same logical level and of a number which is equal to or greater than the first predetermined number are consecutively output, the logical level is then inverted, and successive bits of the same logical level and of a number which is equal to or greater than the first predetermined number are consecutively output; and second fixed bit pattern output means for repeating an operation in which bits of the same logical level and of a number equal which is, equal to or greater than the number of consecutive bits of the same logical level which are output by the first fixed bit pattern output means are consecutively output, the logical level is then inverted, and successive bits of the same logical level and of a number which is equal to or greater than the number of consecutive bits of the same logical level which are output by the first fixed bit pattern output means are consecutively output. Switch means conducts a switch operation so that, during an idle time other than a transmission time for transmitting transmission data, the output of the first fixed bit pattern output means is transmitted during the time other than a time for reporting a fault, and the output of the second fixed bit pattern output means is transmitted during a time for reporting a fault. In a receiving station, a fault or a reception of a fault reporting is detected on the basis of existence of a consecutive reception of bits of the same logical level and of a number which is equal to or greater than the number of the consecutive bits of the same logical level which are output by the first fixed bit pattern output means, and a consecutive reception of bits of the same logical level and of a number which is equal to or greater than the number of the consecutive bits of the same logical level which are output by the second fixed bit pattern output means.

Furthermore, a transmitting station comprises: transmission signal transmission halt means for halting a transmission of a transmission signal every time a transmission corresponding to a predetermined number of cycles of a transmission clock signal is conducted, including an idle time; and logical signal output means for outputting a logical signal every time a transmission of a transmission signal is halted by the transmission signal transmission halt means, a logical signal previously output by the logical signal output means being different in kind from a logical signal newly output by the logical signal output means. Switch means conducts a switch operation so that, during a period when a transmission of a transmission signal is halted by the transmission signal transmission halt means, the output of the logical signal output means is transmitted. In a receiving station, a fault is detected on the basis of a consecutive reception of bits of the same logical level and of a number which is greater than the predetermined number of cycles of the transmission clock signal.

Furthermore, transmission data in which the number of consecutive bits of the same logical level is less than a first predetermined number is transmitted, and a transmitting station comprises inverting means- for inverting a logical level of a transmission signal. Switch means conducts a switch operation so that, each time a time longer than a period corresponding to the first predetermined number of cycles of a transmission clock signal has elapsed, the transmission signal and the output of the inverting means are alternately transmitted. In a receiving station, a fault is detected on the basis of a consecutive reception of bits of the same logical level and continuing for a period which is longer than a time interval of switching of the switch means.

The signal transmission according to a first embodiment of the invention will be described in detail, using as an example the transmission between station B 201 and station C 301 of the network of FIG. 16.

Figure 16:
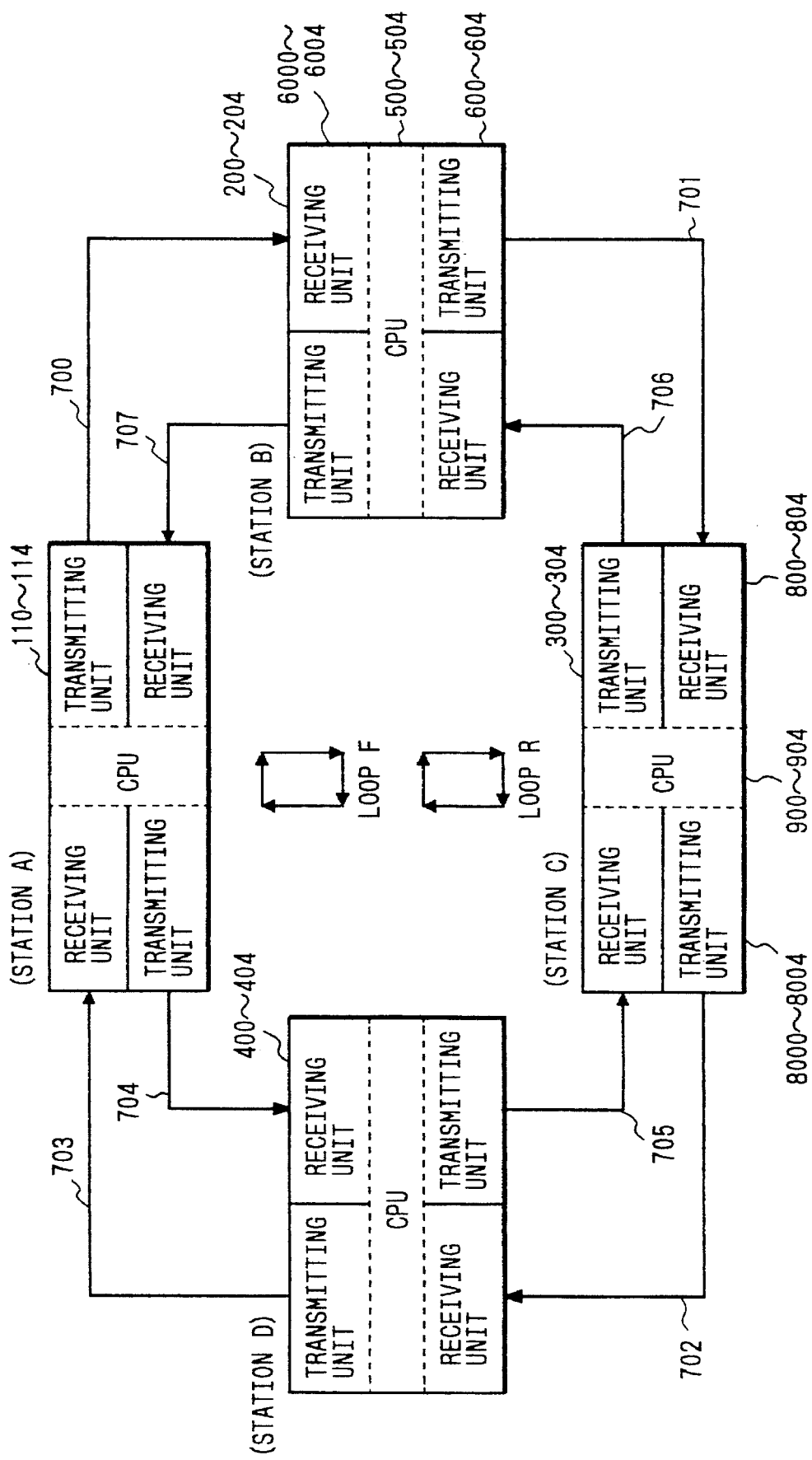
FIG. 16 is a block diagram showing a network.

FIG. 1 is a block diagram showing in detail a CPU 501 and a transmitting unit 601 for loop F of station B 201 of the network of FIG. 16, and a receiving unit 801 and a CPU 901 for loop F of station C 301. In the figure, the transmitting unit 601 of station B 201 and the receiving unit 801 of station C 301 are connected to each other through a transmission line 701.

As shown in FIG. 16, for each of loops F and R, station B 201 comprises a receiving unit 6001, the CPU 501 and the transmitting unit 601. In FIG. 1, among of these units, only the CPU 501 and the transmitting unit 601 for loop F are shown, and the receiving unit 6001 for loop F is not shown.

Similarly, for each of loops F and R, station C 301 comprises the receiving unit 801, the CPU 901 and a transmitting unit 8001. In FIG. 1, among of these units, only the receiving unit 801 and the CPU 901 for loop F are shown, and the transmitting unit 8001 for loop F is not shown.

In FIG. 1, 501 designates the CPU of station B 201, and 601 designates the transmitting unit. The reference numeral 103 designates a transmitter to which a transmission clock signal and information from the CPU 501 are input. The reference numeral 2202 designates a fixed bit pattern generator for generating a fixed bit pattern "0000000011111111", 2203 designates a parallel-serial converter for converting a parallel signal of the fixed bit pattern generated by the fixed bit pattern generator 2202 into a serial signal, and 2205 designates switching unit, for example, a switch circuit for selectively outputting one of a transmission signal from the transmitter 103 which becomes transmission data, and the fixed bit pattern output from the parallel-serial converter 2203. The transmitter 103 sends the switch circuit 2205 a transmission signal and an idle state signal 2204 indicative of the idle state.

The transmitting unit 601 of station B 201 consists of the transmitter 103, the fixed bit pattern generator 2202, the parallel-serial converter 2203, and the switch circuit 2205. The fixed bit pattern generator 2202, and the parallel-serial converter 2203 constitute the fixed bit pattern output means.

The reference numeral 801 designates the receiving unit of station C 301, 901 designates the CPU, 109 designates a receiver which picks out from a reception signal information to be transmitted to the CPU 901 and outputs it to the CPU 901, 2209 designates a differential circuit for differentiating the reception signal, and 2206 designates a counter which counts a reception clock signal and which is reset by the differential output of the differential circuit 2209. The counter 2206 detects the number of consecutive "1s" or "0s" of the reception signal. The reference numeral 2208 designates a comparison value generator for generating a comparison value "8", 2207 designates a digital comparator which compares the output of the counter 2206 with the output of the comparison value generator 2208 and checks whether or not the value of the counter 2206 exceeds "8", and 901 designates a CPU for controlling station C 301. The receiving unit 801 of station C 301 consists of the receiver 109, the differential circuit 2209, the counter 2206, the comparison value generator 2208, and the digital comparator 2207. The counter 2206, the digital comparator 2207, the comparison value generator 2208, and the differential circuit 2209 constitute the fault detection unit.

In the embodiment, it is assumed that the conventional HDLC protocol is used. Therefore, the number of consecutive "1s" is 5 bits or less. A sequence of 6 consecutive "1-bits" is a "flag" indicating the beginning or the end of transmission data, and a consecutive stream of "1s" of a predetermined bit number, for example, 7 bits or more, means the existence of an idle state.

One fixed bit pattern used in the first embodiment has a form in which a consecutive stream of "0s" of a predetermined number, which is equal to or larger than a first predetermined number, have a predetermined meaning. Accordingly, when received by a receiver, it is nullified as transmission data. For example, data in which 8 bits of "0" value are continued and thereafter 8 bits of "1" are continued, i.e., 16- data "0000000011111111", may be used as the fixed bit pattern.

In the first embodiment, signals on the transmission line 701 have a form shown in a time chart of FIG. 2. In the figure, 2000 designates a fixed bit pattern, and 2010 designates a portion for sending transmission data. When each station is powered ON or in the initial state, the connection state of the switch circuit 2205 is switched so that the fixed bit pattern is output to the next station (i.e., the connection is switched to the terminal B).

Then the fixed bit pattern "0000000011111111" which has been subjected to the serial conversion by the parallel-serial converter 2203 is repeatedly output in synchronization with the transmission clock signal.

When transmission data is to be transmitted from station B 201, the CPU 501 activates the transmitter 103 to cause it to enter the transmission state, and the connection state of the switch circuit 2205 is switched to the terminal A so that the transmission data is output to the next station, or station C 301.

In station C 301, the reception signal sent from station B 201 through the transmission line 701 is input to the differential circuit 2209. The differential circuit 2209 outputs a differential output of "1" only when the reception signal changes from "0" to "1" or from "1" to "0", and a differential output of "0" when "0" or "1" is consecutive in the reception signal. The differential output is supplied to a reset input of the counter 2206 which counts the reception clock signal.

Timing charts of FIGS. 3(a) to 3(d) show the state in which, at time 2901 or immediately after the reception signal has changed from "0" to "1" or from "1" to "0", the differential output of the differential circuit 2209 is set to "1" for a period corresponding to 1 cycle of the reception clock signal, and, when "0" or "1" is consecutive in the reception signal, the counter 2206 is not reset but incremented by one in response to the reception clock signal.

An output of a phase locked loop circuit (not shown) is used as the reception clock signal. The phase locked loop circuit is configured so as to output a pulse signal in which the frequency is the same as that of the transmission clock signal of station B (although it may have a minute variation) and the phase coincides with that of the inversion of the reception clock signal.

As described above, the counter 2206 detects the number of consecutive "0s" or "1s". Therefore, the digital comparator 2207 of station C 301 conducts a comparison to judge whether or not the detection value of the counter 2206 exceeds 8. If yes, the digital comparator 2207 outputs an interruption signal to the CPU 901.

FIGS. 4(a) and 4(b) are time charts showing a transmission signal which is transmitted from station B 201 when the transmission line 701 is disconnected during the idle state, and a reception signal which is received by station C 301. The chart shows that the transmission line 701 is disconnected at time 1401 and the digital comparator 2207 detects a consecution of "0" of 8 bits or more at time 1402.

In a transmission in accordance with the HDLC procedure, data cannot be input unless a flag pattern "01111110" is received. Consequently, even if another fixed bit pattern "1111111100000000" is received, it is treated as invalid, thereby causing no trouble. In other words, a flag is recognized as a flag, and data is received as data.

The fixed bit pattern in which the number of consecutive bits of the same logical level is 8 has been used. Alternatively, the number may be 9 or more. In the fixed bit pattern, the number of consecutive "0s" is equal to that of consecutive "1s". The embodiment is not restricted to this approach. As far as the consecutive numbers are equal to or greater than the first predetermined number, the consecutive numbers may be different from each other. In the first embodiment, the transmission and reception processes are conducted in accordance with the HDLC procedure. The embodiment is not restricted to this procedure. In the case where the number of consecutive bits of the same logical level in transmission data is less than a predetermined number, the same effects can be achieved by using a fixed bit pattern in which the number of consecutive bits of the same logical level is greater than the predetermined number.

Figure 5:
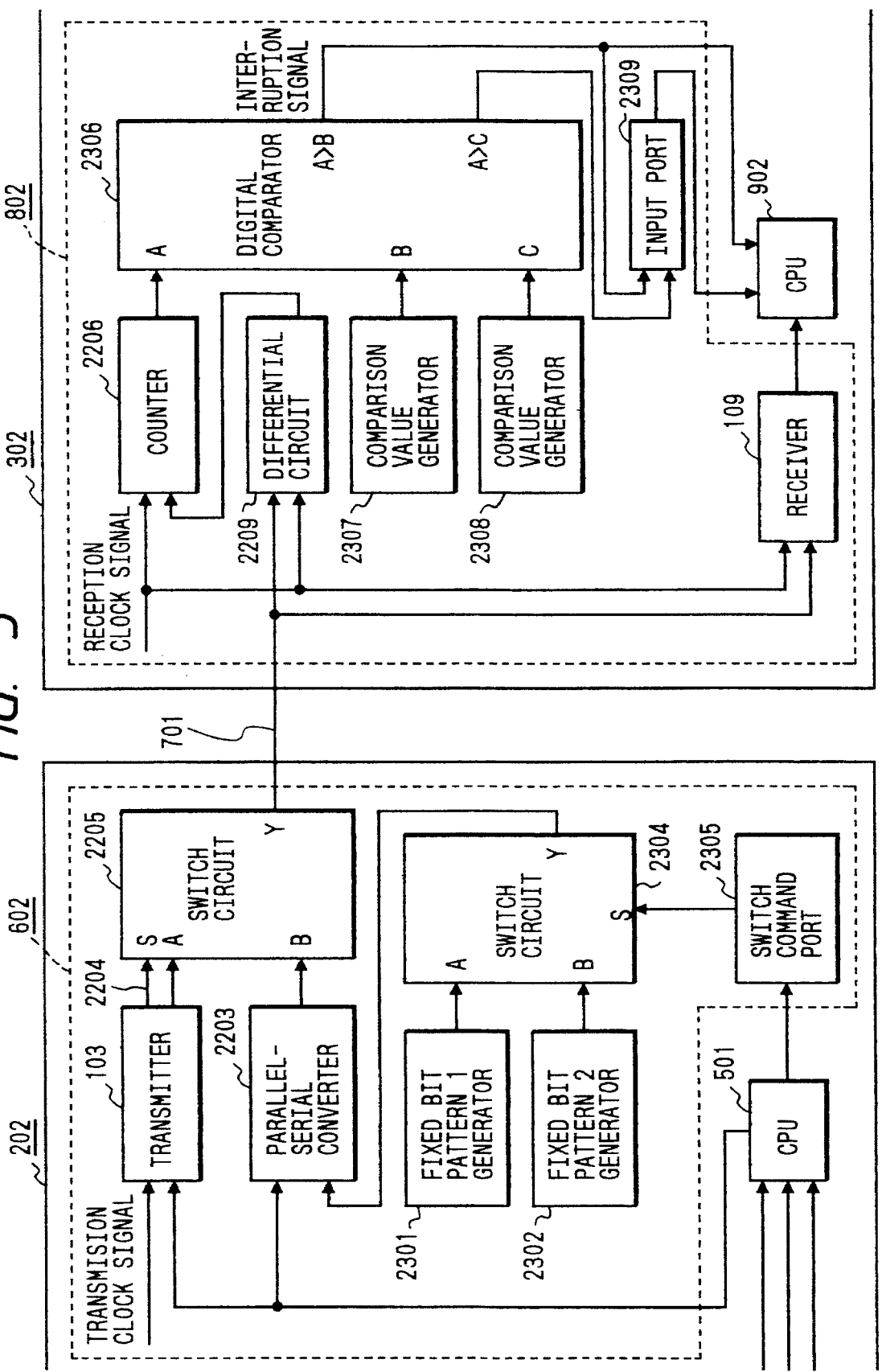
FIG. 5 is a block diagram showing a communication system of a second embodiment of the invention.

FIG. 5 is a block diagram showing another embodiment of the invention, and corresponding to the first embodiment in FIG. 1 as described above. Also in the second embodiment, it is assumed that the transmission and reception processes are conducted in accordance with the HDLC procedure. A receive clock is generated in the same manner as that of the first embodiment.

In station B 202, when there exists transmission data, i.e., during a process of transmitting transmission data, the idle state signal 2204 output from the transmitter 103 is set to be "0" so that transmission data based on a transmission signal from the transmitter 103 is transmitted to station C 302 through the switch circuit 2205 and the transmission line 701. When there exists no transmission data, or when the transmission has been completed, i.e., during the idle time, the idle state signal 2204 is set to be "1" so that the fixed bit pattern is transmitted to station C 302 through the parallel-serial converter 2203, the switch circuit 2205 and the transmission line 701.

In the second embodiment, two kinds of fixed bit patterns are used, i.e., fixed bit pattern 1 which is generated by a fixed bit pattern 1 generator 2301 in the normal time, and fixed bit pattern 2 which is generated by a fixed bit pattern 2 generator 2302 in an error reporting time.

The fixed bit pattern 1 (pattern for the normal idle state) is 32-bit data "00000000111111110000000011111111", and the fixed bit pattern 2 (pattern for error reporting) is 32-bit data "00000000000000001111111111111111".

A switch circuit 2304 operates in accordance with the set state of a switch command port 2305. In the initialization, the switch command port 2305 is set so that the fixed bit pattern 1 is input to the parallel-serial converter 2203.

When an error is to be reported, the switch command port 2305 is set by a CPU 502 so that the fixed bit pattern 2 is input to the parallel-serial converter 2203.

The fixed bit pattern 1 generator 2301, the switch circuit 2304, and the parallel-serial converter 2203 constitute a first fixed bit pattern output means. The fixed bit pattern 2 generator 2302, the switch circuit 2304, and the parallel-serial converter 2203 constitute a second fixed bit pattern output means.

In station C 302, the counter 2206 detects the number of consecutive "0s" or "1s" in a received signal, and a digital comparator 2306 compares the detection result with "8", which is set in a comparison value generator 2307. If the number of consecutive "1s" is greater than "8" generated by the comparison value generator 2307, an error signal 1 is set to be "1", and, if the number of consecutive "1s" is smaller than "8", the error signal 1 is set to be "0". If the number of consecutive "1s" is greater than "16" generated by another comparison value generator 2308, the other output, i.e., an error signal 2, is set to be "1". And, if the number of consecutive "1s" is smaller than "16", the error signal 2 is set to be "0".

These values can be read by a CPU 902 through an input port 2309 so that the CPU recognizes an error report of a fault state of the transmission line. In other words, when the error signal 1 is "1" and the error signal 2 is "0", the CPU 902 recognizes the reception of an error reporting, and, when both the error signals are "1", the CPU 902 recognizes that a fault occurs in the network.

In the initial state after the power is turned ON, or in the idle state before transmission data is transmitted, the idle state signal 2204 of the transmitter 103 is set to be "1". This causes the connection state of the switch circuit 2205 to be switched to the terminal B so that the fixed bit pattern 1 or the fixed bit pattern 2 output from the parallel-serial converter 2203 is output to the transmission line 701.

In the initial state, the switch command port 2305 is set so that the fixed bit pattern 1 is output.

When the transmitter 103 is activated to the transmission state in response to a transmission activation command from the CPU 502, the idle state signal 2204 is set to be "0", and a transmission signal from the transmitter 103 is transmitted to the transmission line 701 through the switch circuit 2205.

When station B 202 is to inform station C 302 of an error, the CPU 502 of station B 202 forcibly sets the transmitter 103 to be the idle state, and the switch circuit 2304 sets the switch command port 2305 so that the fixed bit pattern 2 is output.

In station C 302, the counter 2206 detects the number of consecutive "0s" or "1s", and the digital comparator 2306 compares the detection result with the outputs of the comparison value generators 2307 and 2308, to judge whether or not the number of consecutive "0s" or "1s" exceeds 8, and whether or not the number of consecutive "0s" or "1s" exceeds 16.

If it is confirmed that the number exceeds 8, the error signal 1 which is an output signal of the digital comparator 2306 is set to be "1" and an interruption signal is input to the CPU 902 of station C 302.

If the number of consecutive "0s" or "1s" exceeds 16, the error signal 2 which is an output signal of the digital comparator 2306 is set to be "1", and the error signal 2 is output to another input terminal of the input port 2309.

Then the error signal 1 and the error signal 2 are transmitted to the input port 2309.

After receiving the interruption signal, the CPU 902 waits until a period corresponding to 8 cycles of the reception clock signal, and, after the output of the input port 2309 is determined, reads the contents of the output.

The counter 2206, the differential circuit 2209, the digital comparator 2306, the comparison value generator 2307, and the comparison value generator 2308 constitute the fault detection means.

FIG. 6 is a time chart showing the state in which, when an error reporting is done to inform station C 302 of an occurrence of a fault during a process of transmitting the normal idle signal (fixed bit pattern 1) to station C 302, the CPU 902 of station C 302 detects the error report.

As shown in the figure, before time 5010, station C 302 receives the normal idle signal in which 8 consecutive "0s" and 8 consecutive "1s" appear repeatedly, i.e., the fixed bit pattern 1. After time 5010, in order to inform station C 302 of an error, station B 202 transmits to station C 302 a signal in which 16 consecutive "0s" and 16 consecutive "1s" appear repeatedly, i.e., the fixed bit pattern 2.

At time 5020 when 9 "0s" have consecutively been received, station C 302 recognizes an error. At time 5030, it is detected that the number of consecutive "0s" is only 16, and station C 302 recognizes the reception of the error reporting. Specifically, at time 5020, the CPU 902 is interrupted, and, at time 5030, the digital comparator 2306 detects that the number of consecutive "0s" is not greater than 16. The CPU 902 reads the detection result through the input port 2309, and recognizes the reception of the error report from station B 202.

The fixed bit pattern 1 in which the number of consecutive bits of the same logical level is 8 has been used. Alternatively, the number may be 9 or more, and the fixed bit pattern 2 may be modified so as to have a bit pattern corresponding to the modified fixed bit pattern 1. In both the fixed bit patterns 1 and 2, the number of consecutive "0s" is equal to that of consecutive "1s". The embodiment is not restricted to this approach. As long as the consecutive numbers in the fixed bit pattern 1 are equal to or greater than the first predetermined number and the consecutive numbers in the fixed bit pattern 2 are greater than the maximum consecutive number in the fixed bit pattern 1, the consecutive numbers may be different from each other. In the second embodiment, the transmission and reception processes are conducted in accordance with the HDLC protocol. The embodiment is not restricted to this approach. In the case where the number of consecutive bits of the same logical level in transmission data is less than a predetermined number, the fixed bit pattern 1 in which the number of consecutive bits of the same logical level is equal to or greater than the predetermined number may be used, and the fixed bit pattern 2 may be modified so as to have a bit pattern corresponding to the modified fixed bit pattern 1.

Figure 7:
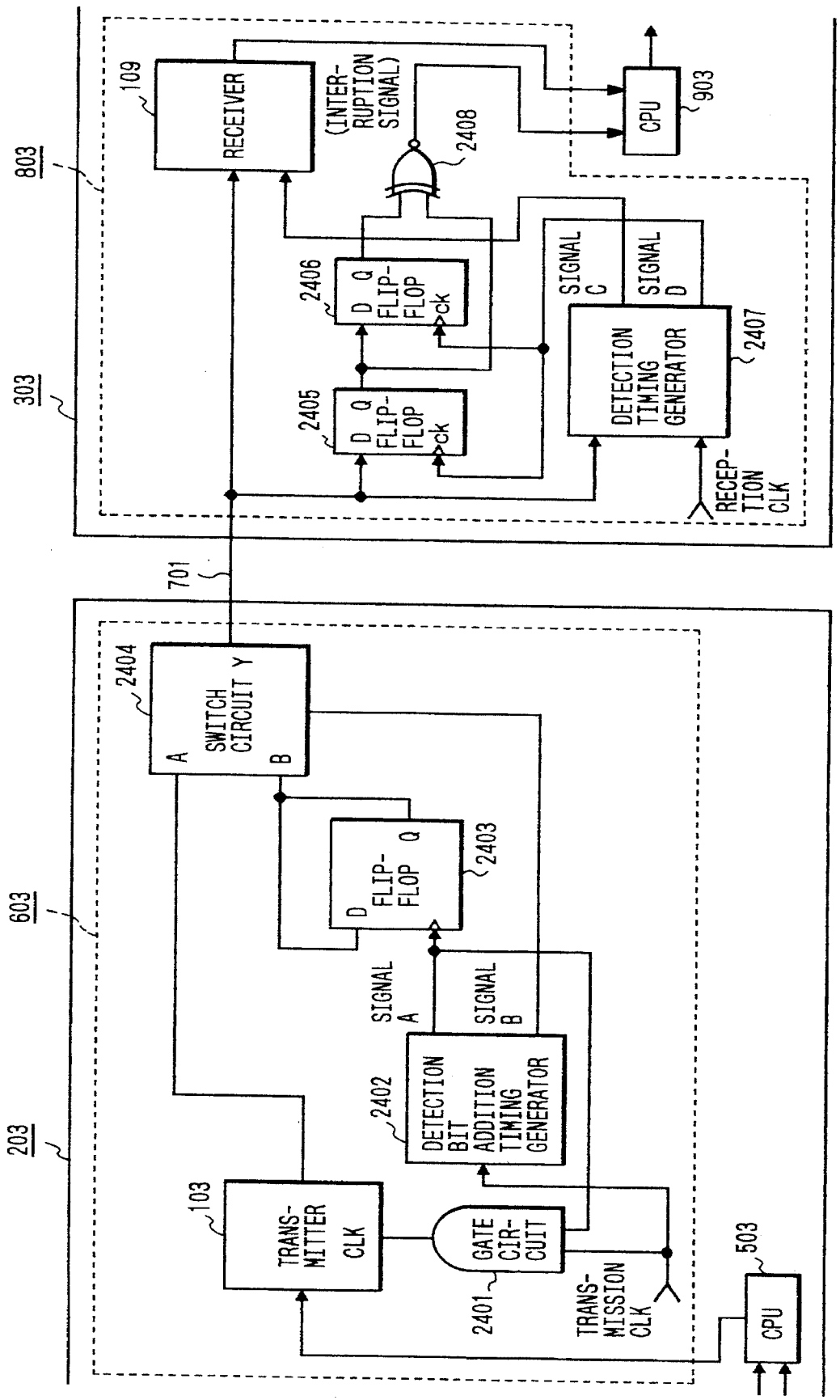
FIG. 7 is a block diagram showing a communication system of a third embodiment of the invention.
Figure 8:
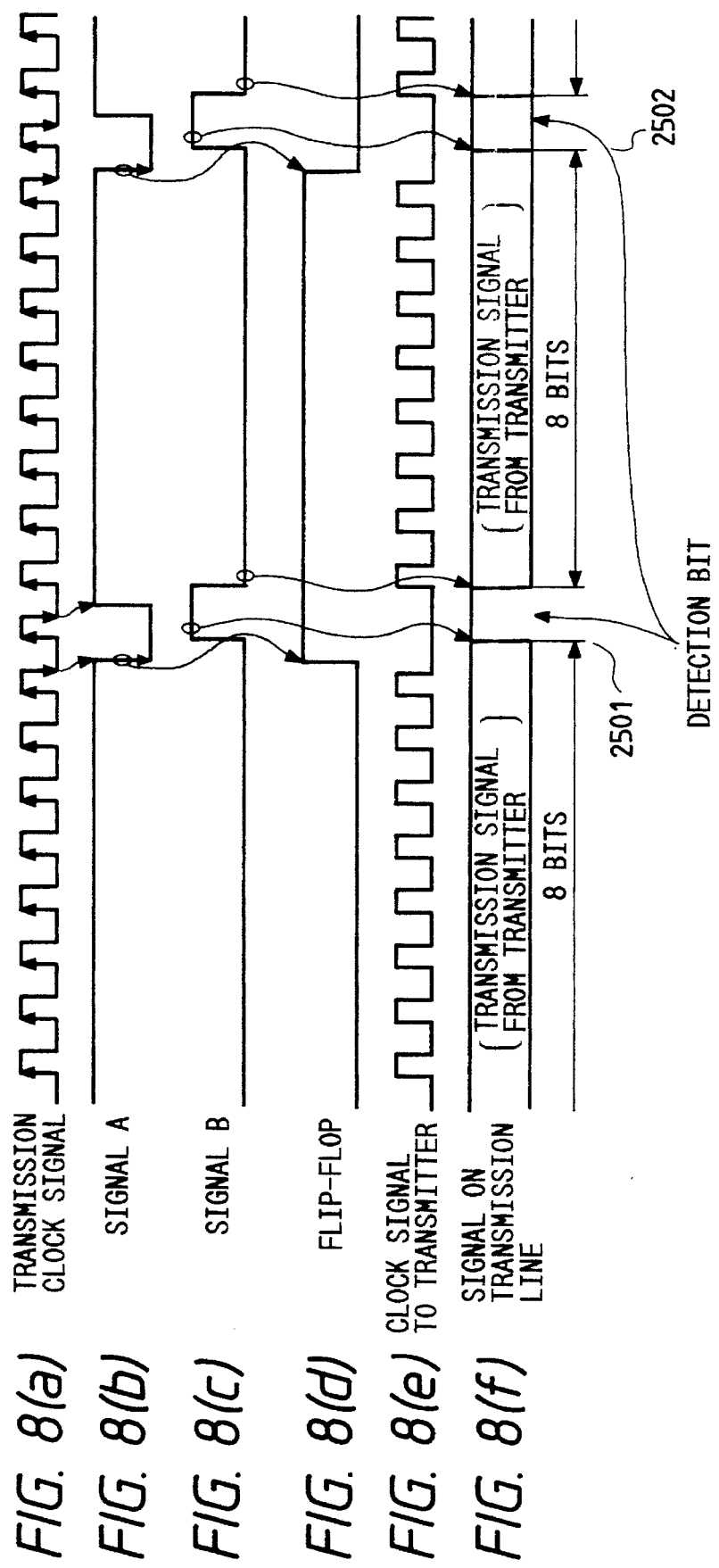
FIGS. 8 (a) to 8 (f) are time charts showing signals such as a signal on a transmission line in the third embodiment of the invention.
Figure 9:
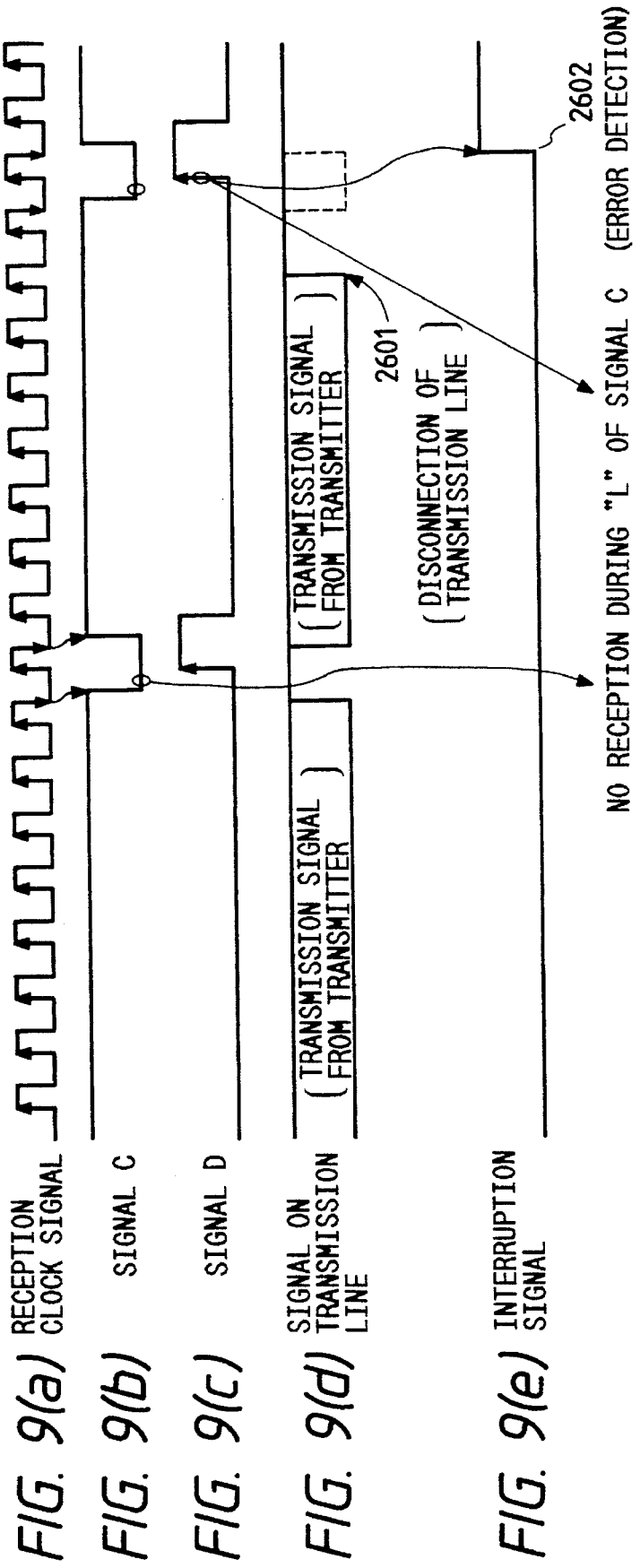
FIGS. 9 (a) to 9 (e) are time charts showing signals such as a signal on the transmission line in the third embodiment of the invention.

FIG. 7 is a block diagram showing a further embodiment of the invention, corresponding to the second embodiment in FIG. 5, as described above. In the figure, 2401 designates a gate circuit, 2402 designates a detection bit addition timing generator, 2403 designates logical signal output means such as a flip-flop, and 2404 designates switch unit, for example, a switch circuit. The reference numeral 2405 designates a flip-flop, 2406 designates a flip-flop, 2407 designates a detection timing generator, and 2408 designates a confirmation circuit. When both the flip-flops 2405 and 2406 are set or reset, the confirmation circuit 2408 outputs "1" indicative of a fault detection. When the flip-flops 2405 and 2406 are set in an exclusive manner, it is regarded that no fault is detected and the confirmation circuit 2408 outputs "0".

As shown in the figure, the transmitting unit 603 of station B 203 consists of the transmitter 103, the gate circuit 2401, the detection bit addition timing generator 2402, the flip-flop 2403, and the switch circuit 2404. The receiving unit 803 of station C 303 consists of the receiver 109, the flip-flops 2405 and 2406, the detection timing generator 2407, and the confirmation circuit 2408. The gate circuit 2401, and the detection bit addition timing generator 2402 constitute the transmission signal transmission halt means. The flip-flops 2405 and 2406, the detection timing generator 2407, and the confirmation circuit 2408 constitute the fault detection means.

In the transmitting unit 603 of station B 203, the detection bit addition timing generator 2402 receives the transmission clock signal, and, in accordance with the transmission clock signal, outputs signal B which is a timing signal for adding a detection bit, and signal A which is used for locking the transmission clock signal by the gate circuit 2401 so as to inhibit the transmitter 103 from outputting the transmission signal when a detection bit is to be added.

When 8 bits of a transmission signal are output from the transmitter 103, the transmission clock signal is locked by signal A during the next one-bit time, and therefore the transmitter 103 is halted. Then, the connection state of the switch circuit 2404 is switched to the detection bit side, and, as a result, a detection bit of one bit is transmitted. The value of the detection bit is equal to the output value of the flip-flop 2403 which is connected in such a manner that the output is inverted every time signal A is input.

Accordingly, every time the transmitter 103 transmits 8 bits of a transmission signal, the 1-bit detection bit, which alternately has a value "0" or "1", is added to the signal to be transmitted.

Also in the idle state, in accordance with signal A and signal B, the above-mentioned 1-bit detection bit is similarly added, and transmitted to the transmission line 701 every time the time corresponding to 8 bits has elapsed.

FIGS. 8(a) to 8(f) are timing charts showing the operation of the detection bit addition timing generator 2402 of station B 203. As shown in the figures, during a period corresponding to 1 cycle of the transmission clock signal after time 2501, signal B is set to be "1" and the input of the transmission clock signal to the transmitter 103 is halted, so that the output of the transmission signal from the transmitter 103 to the switch circuit 2404 is halted and the detection bit "1" is transmitted to the transmission line 701. After time 2502 later than time 2501 by a period corresponding to 8 cycles of the transmission clock signal, signal B is again set to be "1" during a period corresponding to 1 cycle of the transmission clock signal, and the input of the transmission clock signal to the transmitter 103 is halted, so that the output of the transmission signal from the transmitter 103 to the switch circuit 2404 is halted, and the detection bit "0" is transmitted to the transmission line 701.

Next, the operation of the receiving unit 803 of station C 303 will be described. In accordance with the reception signal and the reception clock signal, the timing generator 2407 outputs signal C and signal D. Signal C is a signal for halting the receiver 109 from receiving a signal so that the transmitted detection bit is not received by the receiver 109, and signal D is a timing signal for causing the flip-flops 2405 and 2406 to latch respective input signals. The reception clock signal is generated in the same manner as that used in the first embodiment. The detection timing generator 2407 may be configured so as to generate signal C and signal D in synchronization with, for example, a received signal during the idle time.

Furthermore, a reception signal from the transmission line 701 is input to the flip-flop 2405, and the Q output of the flip-flop 2405 is input to the flip-flop 2406.

When a detection bit is transmitted from station B 203, the detection bit is input to the flip-flop 2405 in station C 303 in response to signal D output from the detection timing generator 2407, and a detection bit, which was previously transmitted from station B 203 and input to the flip-flop 2405, is latched by the flip-flop 2406 in the next stage.

Then, the confirmation circuit 2408 checks the outputs of the flip-flops 2405 and 2406 to judge whether or not the value of the newly received detection bit coincides with that of the previously received detection bit. If so, it is determined that a fault is detected and an interruption signal is sent to the CPU 903.

FIGS. 9(a) to 9(e) are timing charts showing the operation of station C 303 conducted when disconnection occurs in the transmission line 701.

As shown in the figures, when a fault such as disconnection of the transmission line 701 occurs at time 2601, the signal received by station C 303 becomes free from any change. Therefore, the error is detected at time 2602 when it is confirmed that the value of the previously received detection bit is equal to that of the newly received detection bit.

Figure 10:
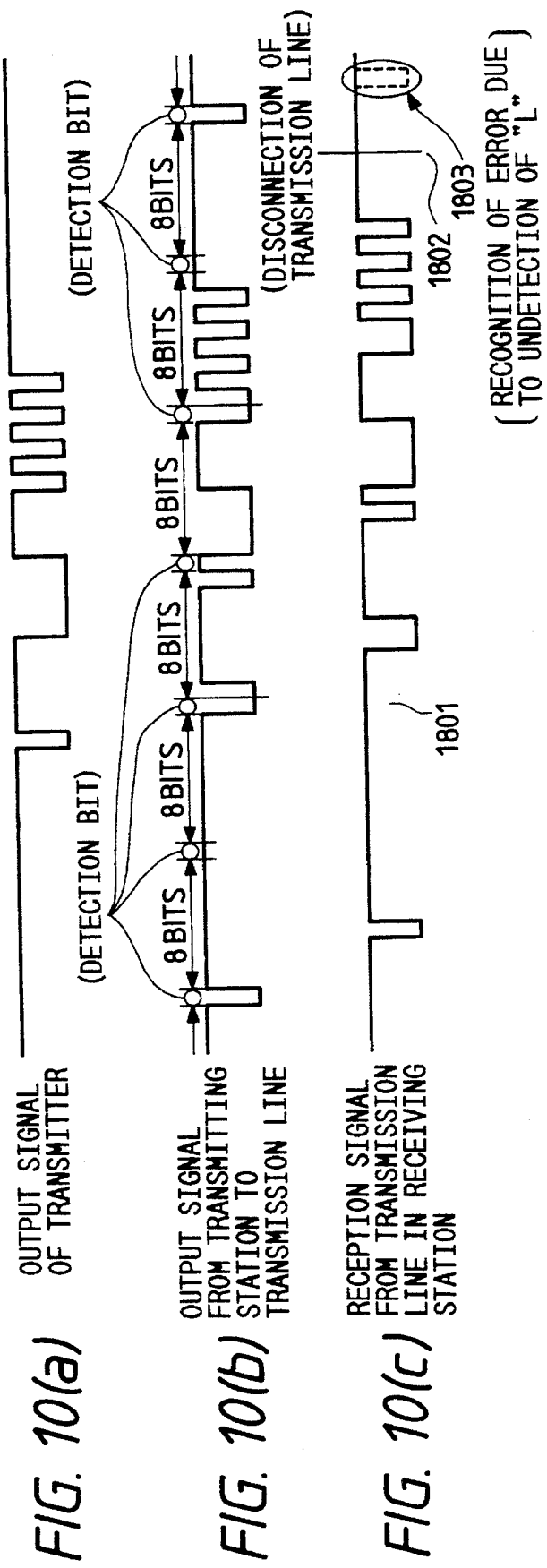
FIGS. 10(a) to 10(c) are time charts showing signals such as a signal on the transmission line in the third embodiment of he invention.

FIGS. 10(*a*) to 10(*c*) are time charts showing signals such as a signal on the transmission line obtained in the case where the transmission line 701, on which an example of transmission, data is transmitted is disconnected. FIG. 10(*a*) indicates the output signal of the transmitter 103 of station B 203, FIG. 10(*b*) indicates the output signal of the switch circuit 2404 (the signal on the transmission line), and FIG. 10(*c*) indicates the signal received by station C 303.

As shown in the figures, the idle time continues until time 1801. Station C 303 receives a signal which has the same value (H level in the figure) for a period corresponding to 17 bits, and thereafter has an inverted value (L level in the figure) for a period corresponding to 1 bit. After time 1801, station C 303 receives a signal in which the detection bit is inserted every time 8 bits of the transmission data are transmitted.

It is assumed that disconnection occurs in the transmission line 701 at time 1802. At time 1803, when the detection bit ought to be detected, the detection bit is not received. Therefore, the confirmation circuit 2408 outputs an interruption signal to the CPU 903 of station C 303, and the CPU recognizes that a fault has occurred in the transmission line 701.

In the embodiment, the detection bit is inserted every time 8 bits of the transmission data are transmitted. Alternatively, the detection bit may be inserted every time when an arbitrary number of bits of transmission data are transmitted, as long as this insertion does not interfere the transmission of the transmission data. Although the time intervals of inserting the detection bit are always constant, they may be set so as to be different from each other. The 1-bit detection bit is used in the embodiment. The detection bit may consist of plural bits, or different logical signals of plural bits may be inserted alternately at insertion time intervals. Although two kinds of detection bits are set, it is possible to set three or more kinds of detection bits.

Figure 11:
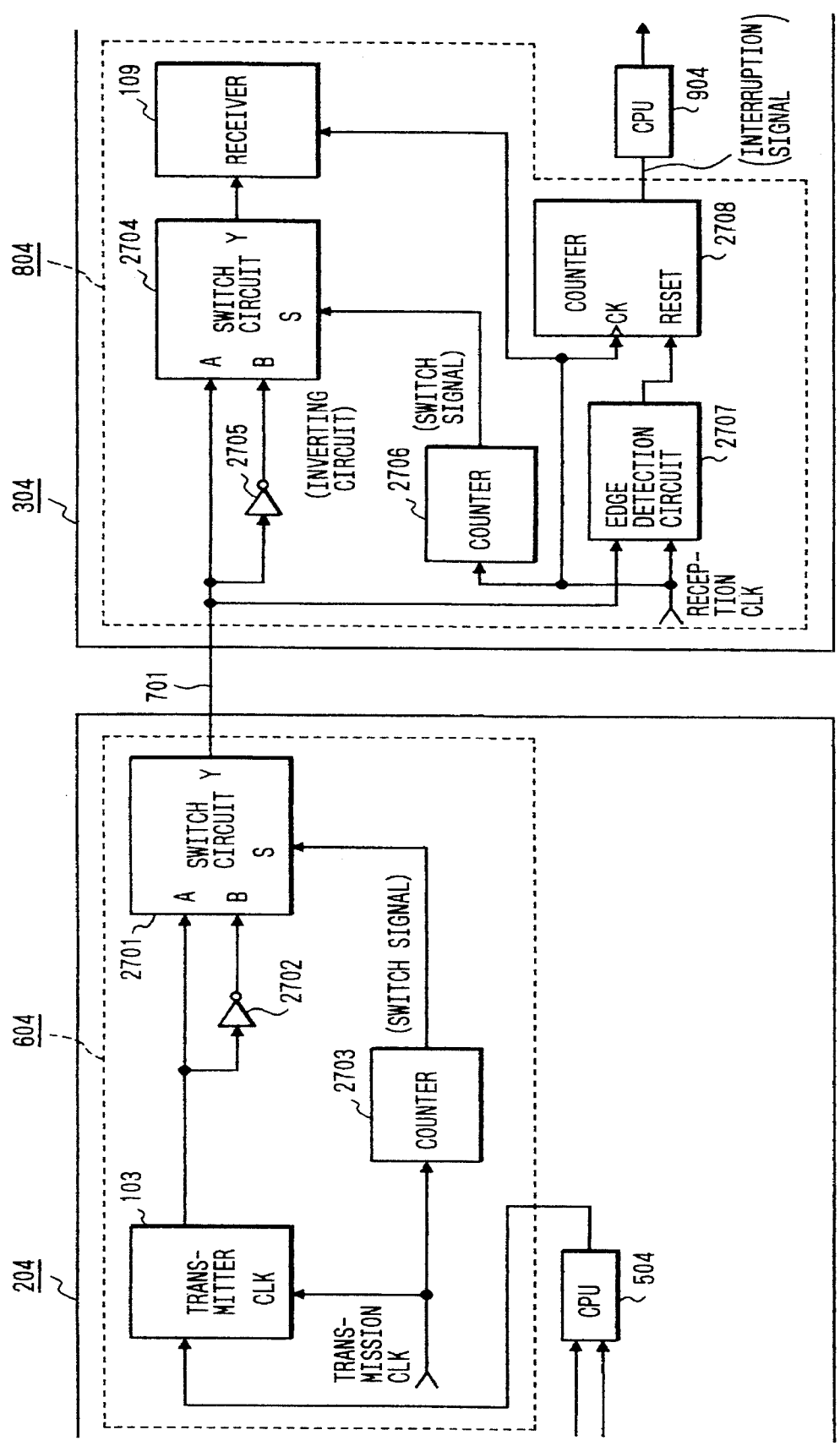
FIG. 11 is a block diagram showing a communication system of a fourth embodiment of the invention.

FIG. 11 is a block diagram showing a still further embodiment of the invention, which corresponds to the third embodiment of FIG. 7, as described above. Also in the embodiment, it is assumed that the transmission and reception processes are conducted in accordance with the HDLC procedure.

In the figure, 2701 designates a switch circuit, 2702 designates inverting means, for example, an inverting circuit, 2703 designates a counter, 2704 designates a switch circuit, 2705 designates an inverting circuit, 2706 designates a counter, 2707 designates an edge detection circuit, and 2708 designates a counter.

As shown in the figure, the transmitting unit 604 of station B 204 consists of the transmitter 103, the switch circuit 2701, the inverting circuit 2702, and the counter 2703. The receiving unit 804 of station C 304 consists of the receiver 109, the switch circuit 2704, the inverting circuit 2705, the counter 2706, the edge detection circuit 2707, and the counter 2708. The switch circuit 2701, and the counter 2703 constitute the switch means, and the edge detection circuit 2707, and the counter 2708 constitute the fault detection means.

In station B 204, the counter 2703 counts the transmission clock signal and outputs to the switch circuit 2701 a switch signal in which the level is inverted at intervals of 8 cycles of the transmission clock signal. When the switch signal from the counter 2703 is "0", the switch circuit 2701 outputs the transmission signal from the transmitter 103 to the transmission line 701 as it is, and, when the switch signal is "1", outputs to the transmission line 701 a signal which is obtained by inverting the transmission signal from the transmitter 103.

Next, the operation of the receiving unit 804 of station C 304 will be described. The counter 2706 counts the reception clock signal, and outputs a switch signal to the switch circuit 2704 on the basis of the count result. The counting operation of the counter 2706 may be conducted in synchronization with, for example, a reception signal from the transmission line 701 during the idle time. The reception clock signal is generated in the same manner as that used in the first embodiment.

The switch signal is a signal in which the level is inverted at intervals of 8 cycles of the reception clock signal. When the switch signal is "0", the switch circuit 2704 outputs the reception signal to the receiver 109 as it is, and, when the switch signal is "1", outputs to the receiver 109 a signal which is obtained by inverting the reception signal, whereby the transmission signal output from the transmitter 103 of station B 204 is restored and input to the receiver 109.

The edge detection circuit 2707 detects an edge of the reception signal, i.e., a changing point where the reception signal changes from the H level to the L level, or a changing point where the reception signal changes from the L level to the H level. The counter 2708 which counts the reception clock signal is reset by the edge detection output of the edge detection circuit 2707.

When the contents of the counter 2708 become equal to or greater than a value (for example, 17) indicating an elapsed time longer than a predetermined monitoring time, the counter 2708 outputs an interruption signal to a CPU 904, thereby reporting a fault detection.

Figure 12:
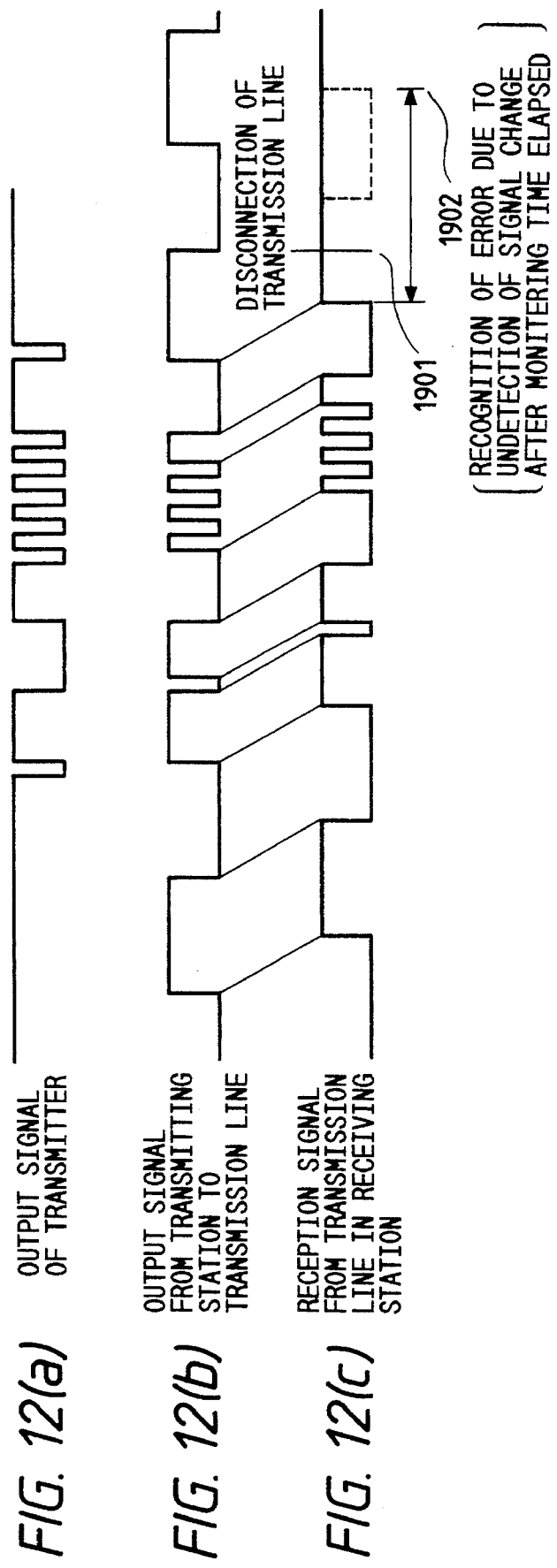
FIGS. 12(a) to 12(c) are time charts showing signals such as a signal on a transmission line in the fourth embodiment of the invention.
Figure 13:
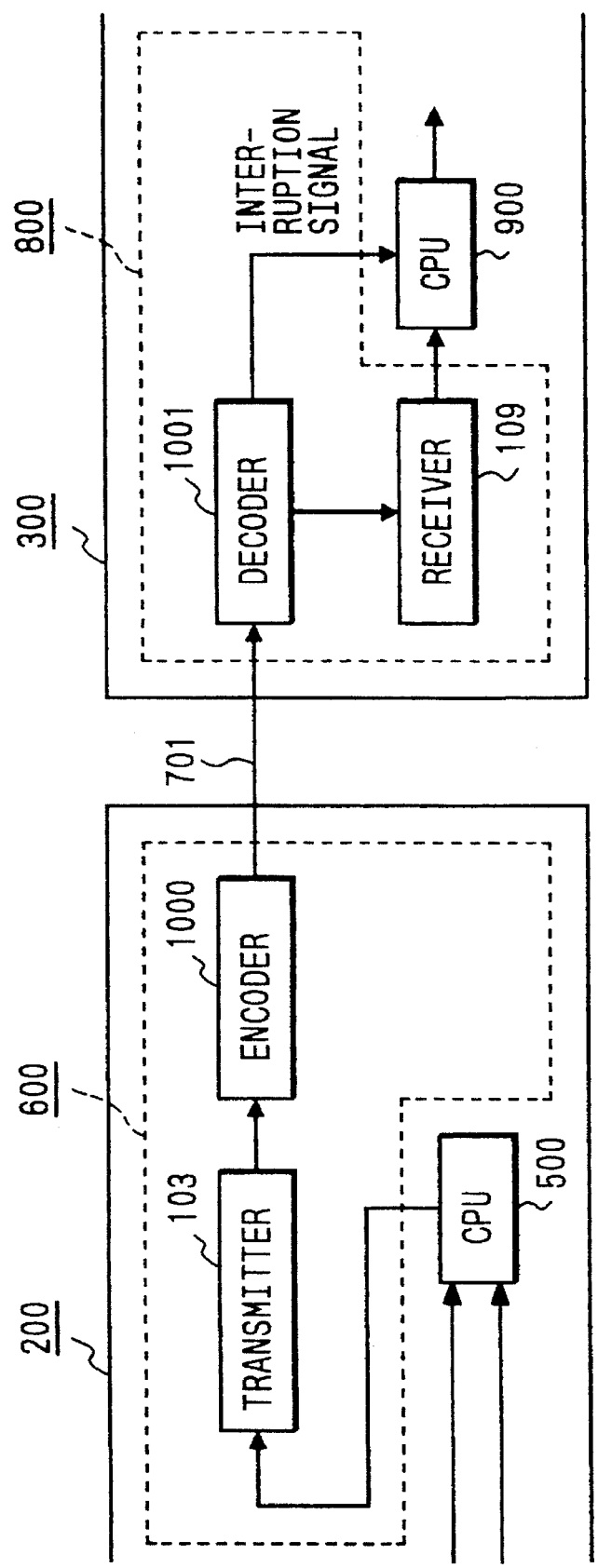
FIG. 13 is a block diagram showing a communication system using a conventional encoding.

FIGS. 12(*a*) to 12(*c*) are time charts showing signals such as a signal on the transmission line 701 obtained in the case where the transmission line 701, on which an example of transmission data is transmitted, is disconnected. FIG. 12(*a*) indicates the output signal of the transmitter 103 of station B 204, FIG. 12(*b*) indicates the output signal of the switch circuit 2701, and FIG. 12(*c*) indicates the signal received by station C 304.

The output signal of the switch circuit 2701 which is shown in FIG. 12(*b*) is a signal obtained by inverting the level of the output signal of the transmitter 103 of station B 204 which is shown in FIG. 12(*a*), at intervals of a predetermined number of cycles of the reception clock signal (every 8 clock cycle in the figure). In the figures, the reception clock signal is not shown.

At time 1901, disconnection of the transmission line 701 occurs. At time 1902, when the monitoring time has elapsed and the logical level of the reception signal ought to be inverted, the inversion fails to occur, and a fault is detected in the transmission line 701. The counter 2708 outputs an interruption signal to the CPU 904, and the CPU 904 recognizes the occurrence of an error.

According to the embodiment, the circuits of the transmission unit for conducting a transmission can be configured more simply than those used in the first embodiment, and therefore can be constructed economically.

In the embodiment, the level of a signal on the transmission line 701 is inverted at intervals of 8 bits. Alternatively, the inversion may be conducted at intervals of an arbitrary number of bits, as long as this inversion does not interfere the transmission of the transmission data. In the embodiment, the inversion of the level of the transmission signal is conducted at the same time intervals. Alternatively, the level of the transmission signal may be inverted at different plural intervals in a sequential manner.

In a fourth embodiment, the transmission and reception processes are conducted in accordance with the HDLC procedure. The embodiment is not restricted to this approved. In the case where the number of consecutive bits of the same logical level in transmission data is less than a predetermined number, the logical level of a signal on the transmission line 701 may be inverted each time bits of a number equal to or greater than the predetermined number have been transmitted.

Embodiments 1 to 4, applied to the double loop system shown in FIG. 16, have been described. The embodiments are not restricted to this, and can be applied to a simple transmission system between two stations.

According to Embodiments 1 to 4, during all the time including the idle time, the line can be monitored, and therefore a fault of the line can rapidly be detected. In the case, as often seen in an application of a programmable controller or the like, where the idle time is longer than a period of transmitting transmission data, or where an accident is liable to happen during an operation halt period in which the power is off, there is a great possibility of detecting an accident during the idle time or a power-on operation process. When applied to such a case, the embodiments can attain a remarkable effect that a fault of the line can rapidly be detected. In the case, as seen in an application of a programmable controller or the like, where disconnection of a transmission line is liable to happen and it is impossible to restore to the original state in a short period, serious damage may be caused such as the work pieces under processing in a production line become defective. When applied to such a case, the embodiments can attain remarkable effects.

According to the previous embodiments 1 to 4, in the double loop system shown in FIG. 16, the host station which manages the transmission line can immediately recognize a fault so that the system is switched to a backup loop in a short period, whereby the system down time can be reduced to a minimum level or, in some cases, can be neglected from the viewpoint of practical use.

As described above, according to the invention, transmission data in which the number of consecutive bits of the same logical level is less than a first predetermined number is transmitted, and a transmitting station comprises fixed bit pattern output means for repeating an operation in which bits of the same logical level and of a number which is equal to or greater than the first predetermined number are consecutively output. The logical level is then inverted, and in successive bits of the same logical level and of a number which is equal to or greater than the first predetermined number are consecutively output. Switch means conducts a switch operation so that, during an idle time other than a transmission time for transmitting transmission data, the output of the fixed bit pattern output means is transmitted. In a receiving station, a fault is detected on the basis of a consecutive reception of bits of the same logical level and of a number which is equal to or greater than the number of the consecutive bits of the same logical level which are output by the fixed bit pattern output means. Therefore, a detection of a fault of a transmission line, such as disconnection of the line, is not required to wait for the interval of transmission and reception and can immediately be transmitted during the idle time; the data transmission rate is not lowered; and it is not necessary to periodically transmit transmission data so that the load on the internal processing of the transmitting station is prevented from increasing.

Furthermore, transmission data in which the number of consecutive bits of the same logical level is less than a first predetermined number is transmitted, and a transmitting station comprises: first fixed bit pattern output means for repeating an operation in which bits of the same logical level and of a number equal to or greater than the first predetermined number are consecutively output. The logical level is then inverted, and successive bits of the same logical level and of a number which is equal to or greater than the first predetermined number are consecutively output; and second fixed bit pattern output means for repeating an operation in which bits of the same logical level and of a number which is equal to or greater than the number of consecutive bits of the same logical level which are output by the first fixed bit pattern output means are consecutively output. The logical level is then inverted, and successive bits of the same logical level and of a number equal to or greater than the number of consecutive bits of the same logical level which are output by the first fixed bit pattern output means are consecutively output. Switch means conducts a switch operation so that, during an idle time other than a transmission time for transmitting transmission data, the output of the first fixed bit pattern output means is transmitted during a time other than a time for reporting a fault, and the output of the second fixed bit pattern output means is transmitted during the time for reporting a fault. In a receiving station, a fault or a reception of a fault reporting is detected on the basis of a consecutive reception of bits of the same logical level and of a number which is equal to or greater than the number of the consecutive bits of the same logical level which are output by the first fixed bit pattern output means, and a consecutive reception of bits of the same logical level and of a number which is equal to or greater than the number of the consecutive bits of the same logical level which are output by the second fixed bit pattern output means. Therefore, a fault reporting from a transmitting station can immediately be recognized; a detection of a fault of a transmission line such as disconnection of the line is not required to wait for the interval of transmission and reception and can immediately be conducted during the idle time; the data transmission rate is not lowered; and it is not necessary to periodically transmit transmission data so that the load on the internal processing of the transmitting station is prevented from being increased.

Furthermore, a transmitting station comprises: transmission signal transmission halt means for halting a transmission of transmission data at intervals of a predetermined number of cycles of a transmission clock signal; and logical signal output means for outputting a logical signal every time when a transmission of transmission data is halted by the transmission signal transmission halt means, a logical signal previously output by the logical signal output means being different in kind from a logical signal newly output by the logical signal output means. Switch means conducts a switch operation so that, during a period when a transmission of transmission data is halted by the transmission signal transmission halt means, the output of the logical signal output means is transmitted. In a receiving station, judge means judges whether or not there is a consecutive reception of bits of the same logical level and of a number which is greater than the predetermined number of cycles of the transmission clock signal. Also in a transmission of transmission data in which the number of the consecutive bits of the same logical level is not limited, a detection of a fault of a transmission line, such as disconnection of the line, is not required to wait for the interval of transmission and reception and can immediately be transmitted during the idle time; the data transmission rate is not lowered; and it is not necessary to periodically transmit transmission data, so that the load on the internal processing of the transmitting station is prevented from increasing.

Furthermore, transmission data in which the number of consecutive bits of the same logical level is less than a predetermined number is transmitted, and a transmitting station comprises inverting means for inverting a logical level of a transmission signal. Switch means conducts a switch operation so that, each time when a time longer than a period corresponding to the predetermined number of cycles of a transmission clock signal has elapsed, the transmission signal and the output of the inverting means are alternately transmitted. In a receiving station, judge means judges whether or not there is a consecutive reception of bits of the same logical level which exceeds a time interval of switching of the switch means. Therefore, a detection of a fault of a transmission line such as disconnection of the line is not required to wait for the interval of transmission and reception and can immediately be conducted during the idle time; the data transmission rate is not lowered; it is not necessary to periodically transmit transmission data so that the load on the internal processing of the transmitting station is prevented from being increased; and circuits of a transmission unit have a simple configuration so as to be economically produced.

Although this invention has been described in at least one preferred embodiment with a certain degree of particularity, it is to be understood that the present disclosure of the preferred embodiment has been made only by way of example and that numerous changes in the details and arrangement of components may be made without departing from the spirit and scope of the invention as hereinafter claimed.

What is claimed is:

1. A communication system comprising a plurality of stations, at least one station being a transmitting station and another station being a receiving station, said stations being connected by a transmission medium and operating on the basis of a signal protocol wherein transmission data has a number of consecutive bits of the same logical level that is less than a first predetermined number, said transmitting station comprising:

fixed bit pattern output means for repeating an operation in which bits of the same logical level and of a number which is equal to or greater than said first predetermined number are consecutively output, the logical level is then inverted, and in succession, bits of the same logical level and of a number which is equal to or greater than said first predetermined number are consecutively output; and switch means for conducting a switch operation so that, during an idle time other than a transmission time for transmitting transmission data, an output of said fixed bit pattern output means is transmitted, and said receiving station comprising:

fault detection means for detecting a fault on the basis of a consecutive reception of bits of the same logical level and of a number which is equal to or greater than the number of the consecutive bits of the same logical level which are output by said fixed bit pattern output means.

2. A communication system comprising a plurality of stations, at least one station being a transmitting station and another station being a receiving station, said stations being connected by a transmission medium and operating on the basis of a signal protocol wherein transmission data has a number of consecutive bits of the same logical level that is less than a first predetermined number, said transmitting station comprising:

first fixed bit pattern output means for repeating an operation in which bits of the same logical level and of a number which is equal to or greater than said first predetermined number are consecutively output, the logical level is then inverted, and in succession, bits of the same logical level and of a number which is equal to or greater than said first predetermined number are consecutively output;

second fixed bit pattern output means for repeating an operation in which bits of the same logical level and of a number which is equal to or greater than the number of consecutive bits of the same logical level which are output by said first fixed bit pattern output means are consecutively output, the logical level is then inverted, and in succession bits of the same logical level and of a number which is equal to or greater than the number of consecutive bits of the same logical level which are output by said first fixed bit pattern output means are consecutively output; and switch means for conducting a switch operation so that, during an idle time other than a transmission time for transmitting transmission data, an output of said first fixed bit pattern output means is transmitted during a time other than a time for reporting a fault, and an output of said second fixed bit pattern output means is transmitted during the time for reporting a fault, and said receiving station comprising:

fault detection means for detecting a fault or a reception of a fault reporting on the basis of existence of a consecutive reception of bits of the same logical level and of a number which is equal to or greater than the number of the consecutive bits of the same logical level which are output by said first fixed bit pattern output means, and a consecutive reception of bits of the same logical level and of a number which is equal to or greater than the number of the consecutive bits of the same logical level which are output by said second fixed bit pattern output means.

3. A communication system comprising a plurality of stations, at least one station being a transmitting station and another station being a receiving station, said stations being connected by a transmission medium and operating on the basis of a signal protocol wherein transmission data is transmitted from the transmitting station to the receiving station, said transmitting station comprises:

transmission signal transmission halt means for halting a transmission of a transmission signal each time that a transmission corresponding to a predetermined number of cycles of a transmission clock signal is conducted, in both a time of transmitting transmission data and an idle time;

logical signal output means for outputting a logical signal each time that a transmission of a transmission signal is halted by said transmission signal transmission halt means, a logical signal previously output by said logical signal output means being different in kind from a logical signal newly output by said logical signal output means; and switch means for conducting a switch operation so that, during a period when a transmission of a transmission signal is halted by said transmission signal transmission halt means, an output of said logical signal output means is transmitted, and said receiving station comprises:

fault detection means for detecting a fault on the basis of a consecutive reception of bits of the same logical level and of a number which is greater than the predetermined number of cycles of the transmission clock signal.

4. A communication system comprising a plurality of stations, at least one station being a transmitting station and another station being a receiving station, said stations being connected by a transmission medium and operating on the basis of a signal protocol wherein transmission data has a number of consecutive bits of the same logical level that is less than a first predetermined number, said transmitting station comprising:

inverting means for inverting a logical level of a transmission signal; and switch means for conducting a switch operation so that, each time when a time which is equal to or longer than a period corresponding to said first predetermined number of cycles of a transmission clock signal has elapsed, said transmission signal and an output of said inverting means are alternately transmitted, and said receiving station comprising:

fault detection means for detecting a fault on the basis of a consecutive reception of bits of the same logical level and continuing for a period which is longer than a time interval of switching of said switch means.

5. The system as claimed in any one of claims 1, 2, 3 or 4 wherein said protocol is a HDLC-type protocol.

6. In a communication system comprising a plurality of stations, at least one station being a transmitting station and another station being a receiving station, said stations being connected by a transmission medium and operating on the basis of a signal protocol wherein transmission data has a number of consecutive bits of the same logical level that is less than a first predetermined number, a method of providing high speed transmission while effectively detecting the occurrence of a fault, comprising:

at said transmitting station, generating a fixed bit pattern output by repeating an operation in which bits of the same logical level and of a number which is equal to or greater than said first predetermined number are consecutively output, the logical level is then inverted, and in succession, bits of the same logical level and of a number which is equal to or greater than said first predetermined number are consecutively output;

switching so that, during an idle time other than a transmission time for transmitting transmission data, an output of said fixed bit pattern is transmitted; and at said receiving station, detecting a fault on the basis of a consecutive reception of bits of the same logical level and of a number which is equal to or greater than the number of the consecutive bits of the same logical level which are output in said fixed bit pattern.

7. In a communication system comprising a plurality of stations, at least one station being a transmitting station and another station being a receiving station, said stations being connected by a transmission medium and operating on the basis of a signal protocol wherein transmission data has a number of consecutive bits of the same logical level that is less than a first predetermined number, a method of providing high speed transmission while effectively detecting the occurrence of a fault, comprising:

at said transmitting station, generating a first fixed bit pattern output by repeating an operation in which bits of the same logical level and of a number which is equal to or greater than said first predetermined number are consecutively output, the logical level is then inverted, and in succession, bits of the same logical level and of a number which is equal to or greater than said first predetermined number are consecutively output;

at said transmitting station, generating and consecutively outputting a second fixed bit pattern by repeating an operation in which bits of the same logical level and of a number which is equal to or greater than the number of consecutive bits of the same logical level which are output as said first fixed bit pattern, inverting the logical level, and, in succession, consecutively outputting bits of the same logical level and of a number which is equal to or greater than the number of consecutive bits of the same logical level which are output as said first fixed bit pattern;

conducting a switch operation so that, during an idle time other than a transmission time for transmitting transmission data, said first fixed bit pattern is transmitted during a time other than a time for reporting a fault, and said second fixed bit pattern output means is transmitted during the time for reporting a fault; and at said receiving station, detecting a fault or a reception of a fault report on the basis of the existence of a consecutive reception of bits of the same logical level and of a number which is equal to or greater than the number of the consecutive bits of the same logical level which are output as said first fixed bit pattern, and a consecutive reception of bits of the same logical level and of a number which is equal to or greater than the number of the consecutive bits of the same logical level which are output as said second fixed bit pattern.

8. In a communication system comprising a plurality of stations, at least one station being a transmitting station and another station being a receiving station, said stations being connected by a transmission medium and operating on the basis of a signal protocol wherein transmission data is transmitted from the transmitting station to the receiving station, a method of providing high speed transmission while effectively detecting the occurrence of a fault, comprising:

at said transmitting station, halting a transmission of a transmission signal each time that a transmission corresponding to a predetermined number of cycles of a transmission clock signal is conducted, in both a time of transmitting transmission data and an idle time;

outputting a logical signal each time that a transmission of a transmission signal is halted, a logical signal previously output being different in kind from a logical signal newly output;

conducting a switch operation so that, during a period when a transmission of a transmission signal is halted, a logical signal output is transmitted; and at said receiving station, detecting a fault on the basis of a consecutive reception of bits of the same logical level and of a number which is greater than the predetermined number of cycles of the transmission clock signal.

9. In a communication system comprising a plurality of stations, at least one station being a transmitting station and another station being a receiving station, said stations being connected by a transmission medium and operating on the basis of a signal protocol wherein transmission data has a number of consecutive bits of the same logical level that is less than a first predetermined number, a method of providing high speed transmission while effectively detecting the occurrence of a fault, comprising:

at said transmitting station, inverting a logical level of a transmission signal;

conducting a switch operation at a switching time interval so that, each time when a time which is equal to or longer than a period corresponding to said first predetermined number of cycles of a transmission clock signal has elapsed, said transmission signal and an inverted logical level signal are alternately transmitted; and at said receiving station, detecting a fault on the basis of a consecutive reception of bits of the same logical level and continuing for a period which is longer than said switching time interval.

10. The method as claimed in any one of claims 6, 7, 8 or 9 wherein said protocol is a HDLC-type protocol.

* * * * *